(12) United States Patent
Chow et al.

(10) Patent No.: US 9,118,435 B2
(45) Date of Patent: Aug. 25, 2015

(54) INTEGRATED PASSIVE OPTICAL NETWORK (PON) SYSTEM

(71) Applicant: NATIONAL CHIAO TUNG UNIVERSITY, Hsinchu (TW)

(72) Inventors: Chi-Wai Chow, Fanling (HK); Chien-Hung Yeh, New Taipei (TW); Jiun-Yu Sung, New Taipei (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 13/791,354

(22) Filed: Mar. 8, 2013

(65) Prior Publication Data

US 2014/0255031 A1 Sep. 11, 2014

(51) Int. Cl.
*H04J 14/00* (2006.01)
*H04J 14/02* (2006.01)
*H04B 10/08* (2006.01)
*H04Q 11/00* (2006.01)

(52) U.S. Cl.
CPC ......... *H04J 14/0256* (2013.01); *H04J 14/0282* (2013.01); *H04Q 11/0067* (2013.01); *H04Q 2011/0086* (2013.01)

(58) Field of Classification Search
CPC .... H04J 14/02; H04J 14/0226; H04J 14/0227
USPC ............................................... 398/68, 66, 43
See application file for complete search history.

(56) References Cited

U.S. PATENT DOCUMENTS

| | | | |
|---|---|---|---|
| 6,137,611 A | 10/2000 | Boivin et al. | |
| 6,711,309 B1 | 3/2004 | Gan et al. | |
| 8,320,760 B1* | 11/2012 | Lam et al. | 398/66 |
| 2008/0138073 A1* | 6/2008 | Kim et al. | 398/79 |
| 2010/0054740 A1* | 3/2010 | Lee et al. | 398/68 |
| 2010/0111543 A1* | 5/2010 | Chow et al. | 398/194 |
| 2010/0142955 A1* | 6/2010 | Yu et al. | 398/72 |
| 2010/0232803 A1* | 9/2010 | Ji et al. | 398/149 |
| 2010/0290782 A1* | 11/2010 | Lee et al. | 398/58 |
| 2011/0076018 A1* | 3/2011 | Ghiggino et al. | 398/58 |
| 2011/0158650 A1* | 6/2011 | Cavaliere et al. | 398/79 |

(Continued)

OTHER PUBLICATIONS

Zhihong Li, Yi Dong, Yixin Wang, Chao Lu; A Novel PSK-Manchester Modulation Format in 10-Gb/s Passive Optical Network System with High Tolerance to Beat Interference Noise; IEEE Photonics Technology Letters, vol. 17, No. 5, p. 1118-1120, May 2005.

(Continued)

*Primary Examiner* — Oommen Jacob
(74) *Attorney, Agent, or Firm* — Rosenberg, Klein & Lee

(57) ABSTRACT

An integrated passive optical network system is disclosed. The system comprises an optical distribution network (ODN), a time-division multiplexing (TDM)-optical line terminal (OLT), a wavelength-division multiplexing (WDM)-optical line terminal (OLT), a plurality of time-division multiplexing (TDM)-optical network units (ONUs), and at least one wavelength-division multiplexing (WDM)-optical network unit (ONU) comprising a first filter. The TDM-OLT and the WDM-OLT respectively transmit a first optical signal carrying a first downstream signal and a second optical signal carrying a second downstream signal to the ONUs through the ODN, and wavelengths of the second optical signal and the first optical signal are different. The TDM-ONUs respectively retrieve the first downstream signal. The WDM-ONU uses the first filter to retrieve the second downstream signal.

15 Claims, 7 Drawing Sheets

(56) References Cited

U.S. PATENT DOCUMENTS

| | | | |
|---|---|---|---|
| 2011/0182578 A1* | 7/2011 | Cavaliere | 398/58 |
| 2011/0236017 A1* | 9/2011 | Ohlen | 398/34 |
| 2011/0274433 A1* | 11/2011 | Presi et al. | 398/97 |
| 2012/0093515 A1* | 4/2012 | Lin et al. | 398/79 |
| 2013/0039656 A1* | 2/2013 | Lam et al. | 398/47 |
| 2014/0255031 A1* | 9/2014 | Chow et al. | 398/68 |

OTHER PUBLICATIONS

Tomoaki Yoshida, Shunji Kimura, Hideaki Kimura, Kiyomi Kumozaki, Takamasa Imai; A New Single-Fiber 10-Gb/s Optical Loopback Method Using Phase Modulation for WDM Optical Access Networks; Journal of Lightwave Technology, vol. 24, No. 2, p. 786-796, Feb. 2006.

* cited by examiner

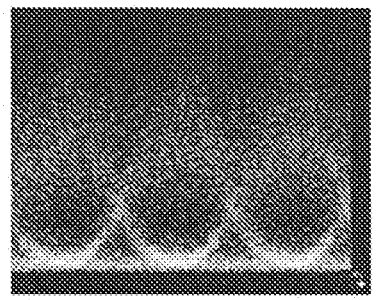
Fig. 11 - PRIOR ART
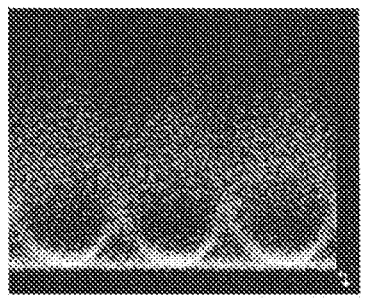
Fig. 12 - PRIOR ART
Fig. 13
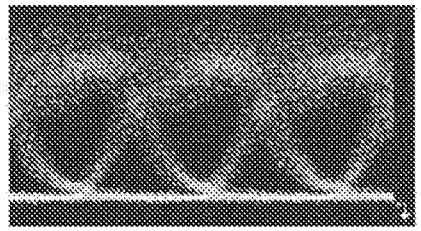
Fig. 14

US 9,118,435 B2

INTEGRATED PASSIVE OPTICAL NETWORK (PON) SYSTEM

BACKGROUND OF THE INVENTION

1. Field of the Invention

The present invention relates to an optical network system, particularly to an integrated passive optical network (PON) system.

2. Description of the Related Art

For transmitting and receiving a large volume of data through a communication network, the communication network has to speed up and broaden in an access network for connecting a subscriber to the communication network, and the introduction of a passive optical network (PON) is performed. The PON is a system where an optical line terminator (OLT) connected to an upper communication network and optical network units (ONUs) including terminals (PC or phone) of plural subscribers are connected to each other through an optical distribution network (ODN) including a trunk optical fiber, an optical splitter and plural branch optical fibers. The main technology used nowadays is a time-division multiplexing (TDM)-PON.

However, many researchers have reported wavelength-division multiplexing (WDM) access systems designed to cope with the increasing capacity of optical access networks. The WDM-PON increases the transmission capacity more than the TDM-PON. Since WDM access systems can share a fiber and assign an individual wavelength path to each user, the transmission capacity can be increased easily and changed independently. However, the TDM-PON is directly dismantled and replaced with the WDM PON, which is uneconomical. Besides, ONUs have to have different and precisely wavelength-tuned light sources in the system. Consequently, ONUs become too expensive. If the service provider provides an optical signal to a user, Rayleigh backscattering will occur. When the wavelengths of an upstream signal and the Rayleigh backscattering overlap, an efficiency of the upstream signal becomes bad.

In view of the problems and shortcomings of the prior art, the present invention provides an integrated passive optical network system, so as to solve the afore-mentioned problems of the prior art.

SUMMARY OF THE INVENTION

The primary objective of the present invention is to provide an integrated passive optical network (PON) system, which uses a filter to retrieve a signal for wavelength-division multiplexing (WDM) and to integrate a time-division multiplexing (TDM)-PON and WDM-PON with the lowest cost, and provides an optical signal carrying a downstream signal and an upstream signal to reduce the cost and the complication of the network system. The system can separate the wavelengths of the upstream signal and an optical signal from a WDM-OLT to promote the performance of the upstream signal.

To achieve the abovementioned objectives, the present invention proposes an integrated passive optical network system, which comprises an optical distribution network (ODN); a time-division multiplexing (TDM)-optical line terminal (OLT) connected with the ODN, generating a first optical signal carrying a first downstream signal, and transmitting the first optical signal to the ODN; a wavelength-division multiplexing (WDM)-optical line terminal (OLT) connected with the ODN, generating a second optical signal carrying a second downstream signal, and transmitting the second optical signal to the ODN, and wavelengths of the second optical signal and the first optical signal are different; a plurality of time-division multiplexing (TDM)-optical network units (ONUs) connected with the ODN to receive the first optical signal and the second optical signal, respectively retrieving the first downstream signal; and at least one wavelength-division multiplexing (WDM)-optical network unit (ONU) comprising a first filter, connected with the ODN to receive the first optical signal and the second optical signal, and the WDM-ONU uses the first filter to retrieve the second downstream signal.

Below, the embodiments are described in detailed in cooperation with the attached drawings to make easily understood the technical contents, characteristics, and accomplishments of the present invention.

BRIEF DESCRIPTION OF THE DRAWINGS

FIG. 11 is an eye diagram showing the upstream signal of the traditional technology with DPSK;

FIG. 12 is an eye diagram showing the upstream signal of the traditional technology without DPSK;

FIG. 13 is an eye diagram showing the upstream signal of the present invention with DPSK; and FIG. 14 is an eye diagram showing the upstream signal of the present invention without DPSK.

DETAILED DESCRIPTION OF THE INVENTION

The present invention seamless integrates a time-division multiplexing (TDM)-passive optical network (PON) and a wavelength-division multiplexing (WDM)-passive optical network (PON) and respectively installs two filters in an optical line terminal (OLT) and an optical network unit (ONU) of the WDM-PON, whereby the users of the WDM-PON can use the allocated wavelength without affecting the TDM-PON, and the TDM-PON is hardly changed. The TDM-PON in existence possesses the specific filtering mechanism, wherein the downstream signal has a wavelength of 1460~1530 nm. If the wavelength of the TDM-PON is reallocated, a filter is installed in the user end to integrate the TDM-PON and the WDM-PON with the lowest change.

Figure 1:
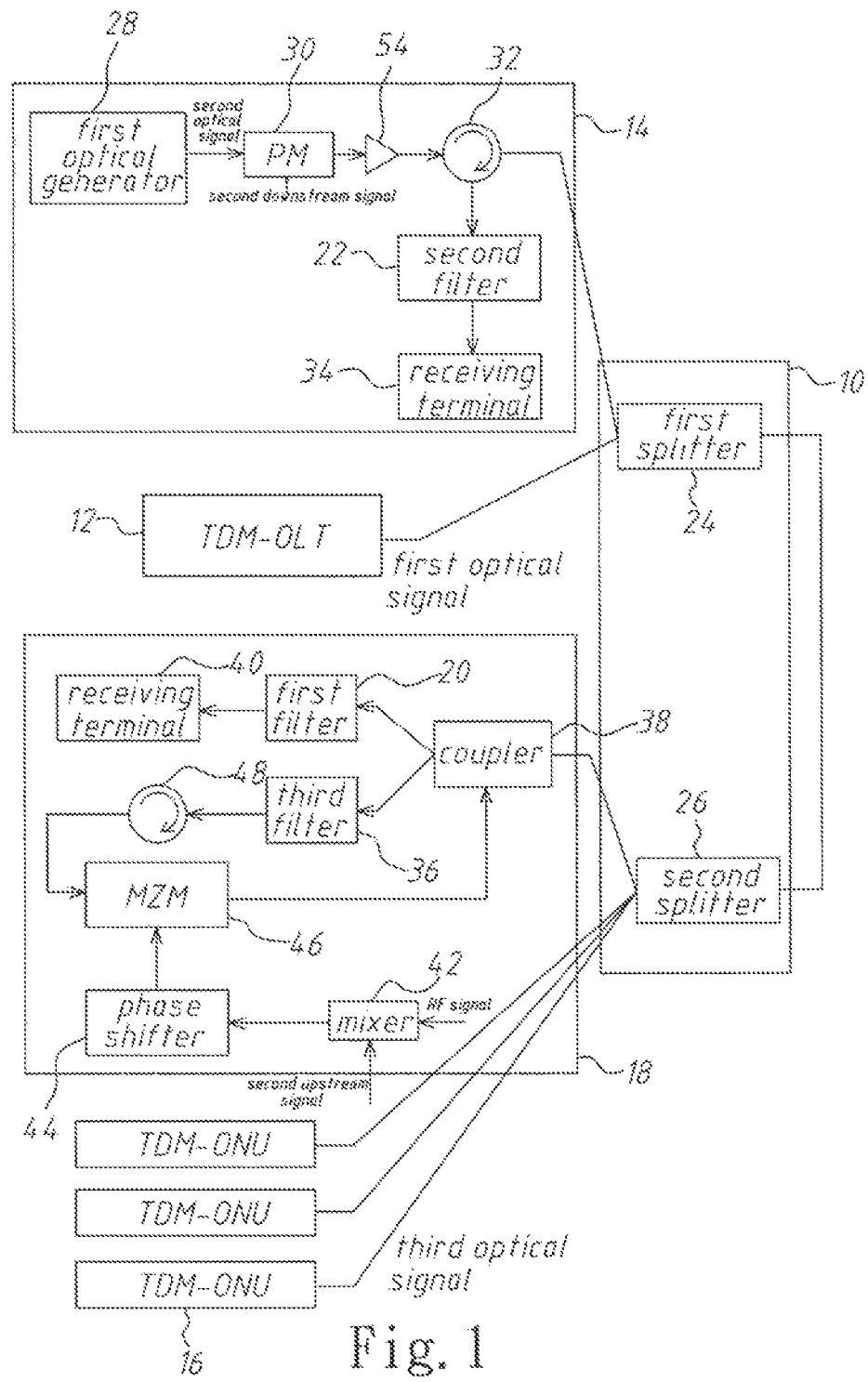
FIG. 1 is a diagram schematically showing an integrated passive optical network system according to the first embodiment of the present invention.

Refer to FIG. 1. The first embodiment is introduced as below. The present invention comprises an optical distribution network (ODN) 10, a time-division multiplexing (TDM)-optical line terminal (OLT) 12, a wavelength-division multiplexing (WDM)-optical line terminal (OLT) 14, a plurality of time-division multiplexing (TDM)-optical network units (ONUs) 16 and at least one wavelength-division multiplexing (WDM)-optical network unit (ONU) 18. The TDM-OLT 12 is connected with the ODN 10, generates a first optical signal carrying a first downstream signal, and transmits the first optical signal to the ODN 10. The WDM-OLT 14 is connected with the ODN 10, generates a second optical signal carrying a second downstream signal, and transmits the second optical signal to the ODN 10, and wavelengths of the second optical signal and the first optical signal are different. The TDM-ONUs 16 are connected with the ODN 10 to receive the first optical signal and the second optical signal, respectively retrieve the first downstream signal. The WDM-ONU 18 is connected with the ODN 10 to receive the first optical signal and the second optical signal. The WDM-ONU 18 comprises a first filter 20 and uses the first filter 20 to retrieve the second downstream signal. The WDM-OLT 14 further comprises a second filter 22, wherein the WDM-ONU 18 modulates the second optical signal to carry a second upstream signal and transmits them to the WDM-OLT 14 and the TDM-OLT 12 through the ODN 10, and then the WDM-OLT 14 uses the second filter 22 to retrieve the second upstream signal from the second optical signal. Besides, after retrieving the first downstream signal, the TDM-ONUs 16 further generate a plurality of third optical signals each carrying a first upstream signal according to the first downstream signal for different duration and transmits the third optical signals to the TDM-OLT 12 and the WDM-OLT 14 through the ODN 10, and then the TDM-OLT 12 retrieves the first upstream signals from the third optical signals.

The ODN 10 further comprises a first splitter 24 and a second splitter 26. The first splitter 24 is connected with the TDM-OLT 12 and the WDM-OLT 14 to receive the first optical signal and the second optical signal and sends them out. The second splitter 26 is connected with the first splitter 24, the TDM-ONUs 16, and the WDM-ONU 18 to receive the first optical signal and the second optical signal and transmits them to the TDM-ONUs 16 and the WDM-ONU 18. Alternatively, the second splitter 26 receives the second and third optical signals from the TDM-ONUs 16 and the WDM-ONU 18, and then sends them to the TDM-OLT 12 and the WDM-OLT 14 through the first splitter 24.

The WDM-OLT 14 further comprises a first optical signal generator 28 such as a distributed feedback (DFB) laser generating the second optical signal; a phase modulator (PM) 30 connected with the first optical signal generator 28, receiving the second optical signal and the second downstream signal, modulating the second optical signal to carry the second downstream signal in Differential Phase Shift Keying (DPSK) format, and sending out the second optical signal; a circulator 32 connected with the second filter 22, the PM 30, and the first splitter 24 of the ODN 10 to receive the second optical signal, and transmitting it to the first splitter 24 of the ODN 10. Alternatively, the circulator 32 receives the second and third optical signals from the ODN 10 and transmits them to the second filter 22, and then the second filter 22 filters out the second optical signal. A receiving terminal 34 is connected with the second filter 22 to receive the second upstream signal.

The WDM-ONU 18 further comprises a third filter 36; a coupler 38 connected with the first filter 20, the third filter 36, and the second splitter 26 of the ODN 10 to receive the first and second optical signals, and transmitting them to the first filter 20 and the third filter 36, and then the first filter 20 filters out the second optical signal and the third filter 36 filters out the second optical signal; a receiving terminal 40 connected with the first filter 20 to receive the second downstream signal; a mixer 42 receiving the second upstream signal and a first radio frequency (RF) signal and using the first RF signal to carry the second upstream signal; a phase shifter 44 connected with the mixer 42 to receive the first RF signal, shifting phase of the first RF signal by 90 degrees, so as to form a second radio frequency (RF) signal carrying the second upstream signal, and sending out the first RF signal and the second RF signal; and a dual-parallel Mach-Zehnder modulator (DP-MZM) 46. The DP-MZM 46 has an upper arm, a lower arm, an input terminal and an output arm. The input terminal is connected with the third filter 36 through a circulator 48 to receive the second optical signal. The upper and lower arms are connected with the phase shifter 44 to respectively receive the first and second RF signals, and the output arm is connected with the coupler 38. The upper and lower arms are biased to $V_\pi$, and the output arm is biased to $V_\pi/2$. As a result, the DP-MZM 46 is biased to modulate the second optical signal to carry the second upstream signal in Amplitude Shift Keying (ASK) format, and frequency of the second upstream signal in the ASK format is equal to frequency of the first RF signal plus frequency of the second optical signal. The frequency of the second upstream signal and the second optical signal are separated to avoid the influence of Rayleigh backscattering onto the second upstream signal. The DP-MZM 46 transmits the second optical signal carrying the second upstream signal in the ASK format to the second splitter 26 through the coupler 38. In other words, the present invention can transmit an upstream signal to the OLT without installing a light source such as a laser in the user end, thereby reducing the cost of the system.

Below is the operation of the first embodiment. Firstly, the TDM-OLT 12 generates the first optical signal carrying the first downstream signal and transmits the first optical signal to the first splitter 24. Meanwhile, the first optical generator 28 generates the second optical signal and transmits it to the PM 30. The PM 30 receives the second downstream signal, modulates the second optical signal to carry the second downstream signal in DPSK format, and sends out the second optical signal to the first splitter 24 through the circulator 32. Then, the first and second optical signals are transmitted from the first splitter 24 to the coupler 38 and the TDM-ONUs 16 via the second splitter 26. Then, the TDM-ONUs 16 respectively retrieve the first downstream signal from the first optical signal. Meanwhile, the coupler 38 transmits the first and second optical signals to the first and third filters 20 and 36. The first and third filters 20 and 36 can filter out the second optical signal. The receiving terminal 40 receives the second downstream signal carried by the second optical signal from the first filter 20.

After retrieving the first downstream signal, the TDM-ONUs 16 generate a plurality of third optical signals each carrying the first upstream signal and transmit the third optical signal to the second splitter 26. Meanwhile, the mixer 42 receives the second upstream signal and the first RF signal and using the first RF signal to carry the second upstream signal. Then, the phase shifter 44 receives the first RF signal and shifts the phase of the first RF signal by 90 degrees, so as to form the second RF signal carrying the second upstream signal and sends out the first and second RF signals. The DP-MZM 46 receives the second optical signal from the third filter 36 through the circulator 48. Since the upper and lower arms of the DP-MZM 46 are biased to $V_\pi$ and the output arm thereof is biased to $V_\pi/2$ the DP-MZM 46 is biased to modulate the second optical signal to carry the second upstream signal in ASK format. The DP-MZM 46 transmits the second optical signal carrying the second upstream signal in the ASK format to the second splitter 26 through the coupler 38. Then, the second and third optical signals are transmitted from the second splitter 26 to the circulator 32 and the TDM-OLT 12 via the first splitter 24. Then, the TDM-OLT 12 retrieves the first upstream signals from the third optical signals. Meanwhile, the circulator 32 transmits the second and third optical signals to the second filter 22. The second filter 22 filters out the second optical signal. Finally, the receiving terminal 34 receives the second upstream signal carried by the second optical signal.

Figure 2:
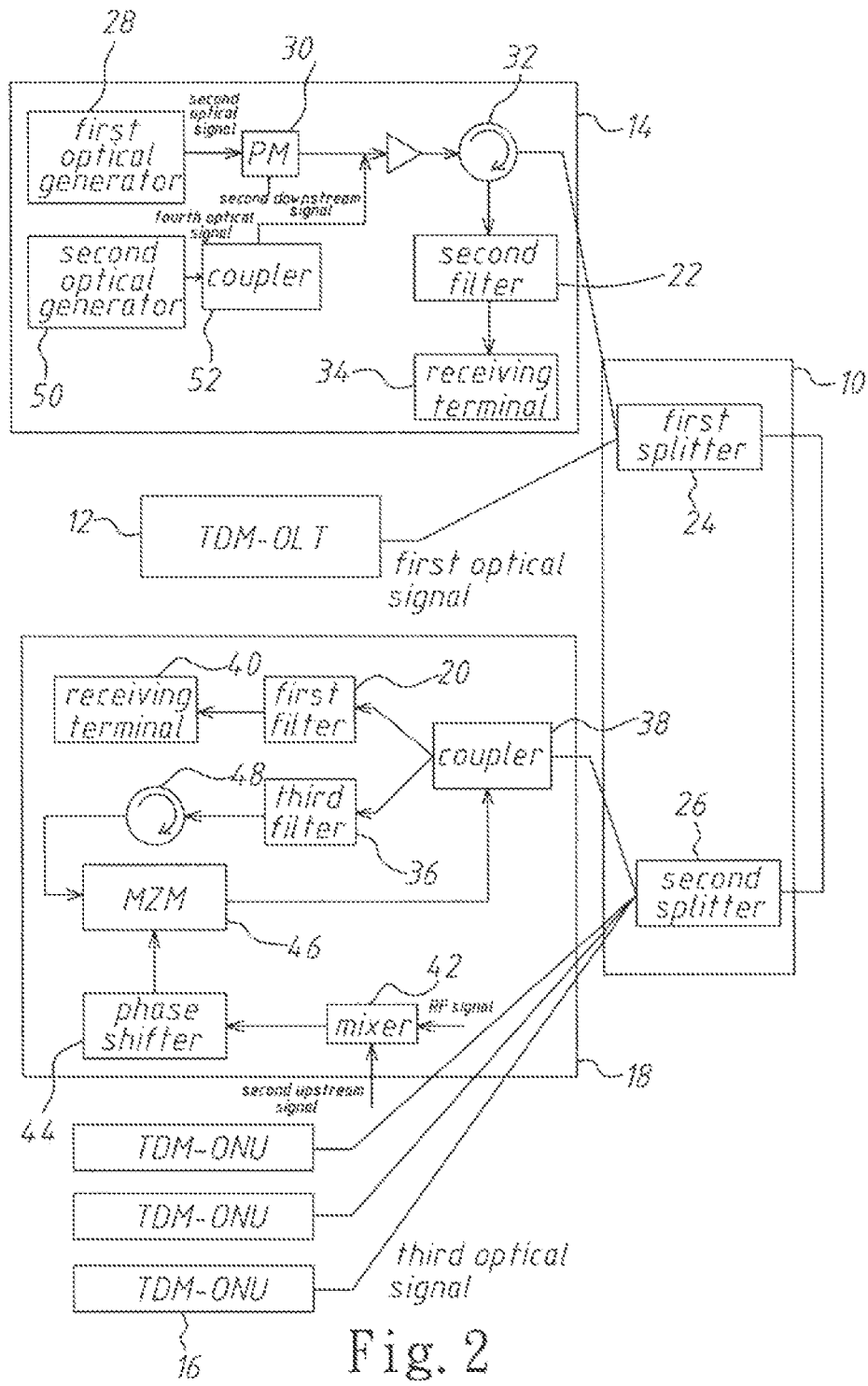
FIG. 2 is a diagram schematically showing an integrated passive optical network system according to the second embodiment of the present invention.

Refer to FIG. 2. The second embodiment is introduced as below. The second embodiment is different from the first embodiment in that the WDM-OLT 14 of the second embodiment further comprises a second optical generator 50 such as a DFB laser and a coupler 52 connected with each other. The coupler 52 is connected with the PM 30. The second optical generator 50 generates a fourth optical signal whose wavelength is different from the wavelengths of the first, second, and third optical signals.

Below is the operation of the second embodiment. Firstly, the TDM-OLT 12 generates the first optical signal carrying the first downstream signal and transmits the first optical signal to the first splitter 24. Meanwhile, the first optical generator 28 generates the second optical signal and transmits it to the PM 30. The PM 30 receives the second downstream signal, modulates the second optical signal to carry the second downstream signal in DPSK format, and sends out the second optical signal to the first splitter 24 through the circulator 32. And, the second optical generator 50 generates the fourth optical signal and transmits it to the first splitter 24 through the coupler 52 and the circulator 32. Then, the first, second, and fourth optical signals are transmitted from the first splitter 24 to the coupler 38 and the TDM-ONUs 16 via the second splitter 26. Then, the TDM-ONUs 16 respectively retrieve the first downstream signal from the first optical signal. Meanwhile, the coupler 38 transmits the first, second, and fourth optical signals to the first and third filters 20 and 36. The first filter 20 can filter out the second optical signal, and the third filter 36 filters out the fourth optical signal. The receiving terminal 40 receives the second downstream signal carried by the second optical signal from the first filter 20.

After retrieving the first downstream signal, the TDM-ONUs 16 generate a plurality of third optical signals each carrying the first upstream signal and transmit the third optical signal to the second splitter 26. Meanwhile, the mixer 42 receives the second upstream signal and the first RF signal and using the first RF signal to carry the second upstream signal. Then, the phase shifter 44 receives the first RF signal and shifts the phase of the first RF signal by 90 degrees, so as to form the second RF signal carrying the second upstream signal, and sends out the first and second RF signals to the DP-MZM 46. The DP-MZM 46 receives the fourth optical signal from the third filter 36 through the circulator 48. Since the upper and lower arms of the DP-MZM 46 are biased to $V_\pi$ and the output arm thereof is biased to $V_\pi/2$, the DP-MZM 46 is biased to modulate the fourth optical signal to carry the second upstream signal in ASK format. The DP-MZM 46 transmits the fourth optical signal carrying the second upstream signal in the ASK format to the second splitter 26 through the coupler 38. Then, the fourth and third optical signals are transmitted from the second splitter 26 to the circulator 32 and the TDM-OLT 12 via the first spinter 24. Then, the TDM-OLT 12 retrieves the first upstream signals from the third optical signals. Meanwhile, the circulator 32 transmits the fourth and third optical signals to the second filter 22. The second filter 22 filters out the fourth optical signal. Finally, the receiving terminal 34 receives the second upstream signal carried by the fourth optical signal.

Figure 3:
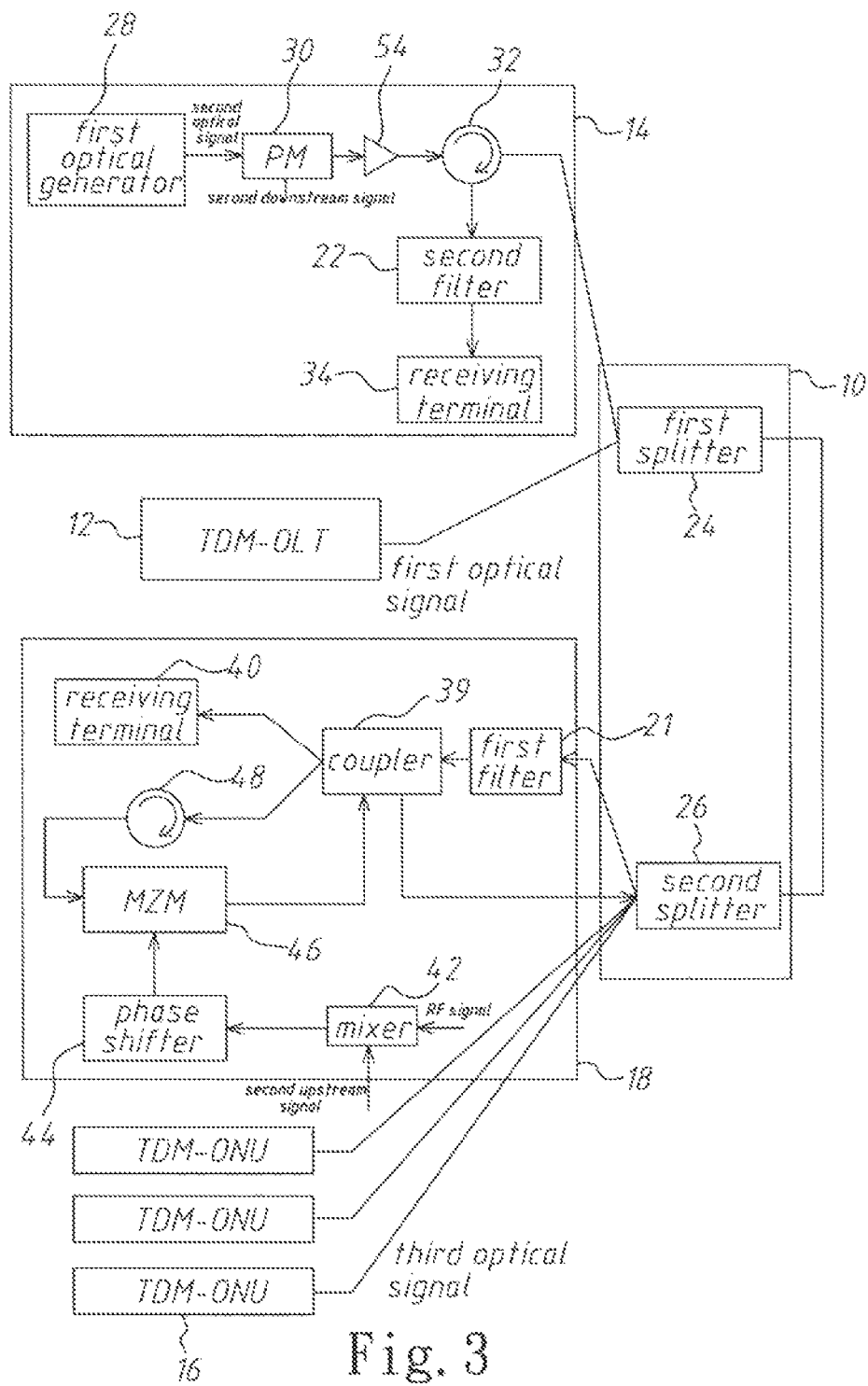
FIG. 3 is a diagram schematically showing an integrated passive optical network system according to the third embodiment of the present invention.

Refer to FIG. 3. The third embodiment is introduced as below. The third embodiment is different from the first embodiment in the WDM-ONU 18. Firstly, the TDM-OLT 12 generates the first optical signal carrying the first downstream signal and transmits the first optical signal to the first splitter 24. Meanwhile, the first optical generator 28 generates the second optical signal and transmits it to the PM 30. The PM 30 receives the second downstream signal, modulates the second optical signal to carry the second downstream signal in DPSX format, and sends out the second optical signal to the first splitter 24 through the circulator 32. Then, the first and second optical signals are transmitted from the first splitter 24 to the first filter 21 and the TDM-ONUs 16 via the second splitter 26. Then, the TDM-ONUs 16 respectively retrieve the first downstream signal from the first optical signal. Meanwhile, the first filter 21 filters out the second optical signal and transmits it to a coupler 39. The receiving terminal 40 connected with the coupler 39 receives the second downstream signal carried by the second optical signal from the coupler 39.

After retrieving the first downstream signal, the TDM-ONUs 16 generate a plurality of third optical signals each carrying the first upstream signal and transmit the third optical signal to the second splitter 26. Meanwhile, the mixer 42 receives the second upstream signal and the first RF signal and using the first RF signal to carry the second upstream signal. Then, the phase shifter 44 receives the first RF signal and shifts the phase of the first RF signal by 90 degrees, so as to form the second RF signal carrying the second upstream signal, and sends out the first and second RF signals. The DP-MZM 46 receives the second optical signal from the coupler 39 through the circulator 48. Since the upper and lower arms of the DP-MZM 46 are biased to $V_\pi$ and the output arm thereof is biased to $V_\pi/2$, the DP-MZM 46 is biased to modulate the second optical signal to carry the second upstream signal in ASK format. The DP-MZM 46 transmits the second optical signal carrying the second upstream signal in the ASK format to the second splitter 26 through the coupler 39. Then, the second and third optical signals are transmitted from the second splitter 26 to the circulator 32 and the TDM-OLT 12 via the first splitter 24. Then, the TDM-OLT 12 retrieves the first upstream signals from the third optical signals. Meanwhile, the circulator 32 transmits the second and third optical signals to the second filter 22. The second filter 22 filters out the second optical signal. Finally, the receiving terminal 34 receives the second upstream signal carried by the second optical signal.

Figure 4:
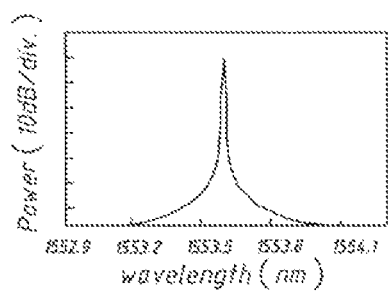
FIG. 4 is a spectrum diagram schematically showing a second optical signal according to an embodiment of the present invention.
Figure 5:
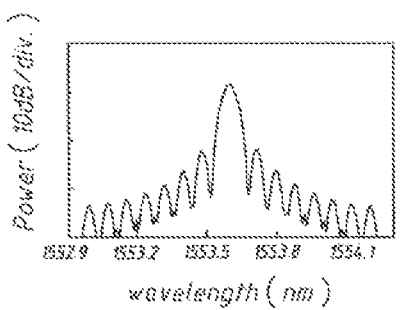
FIG. 5 is a spectrum diagram schematically showing the second optical signal carrying a second downstream signal according to an embodiment of the present invention.
Figure 6:
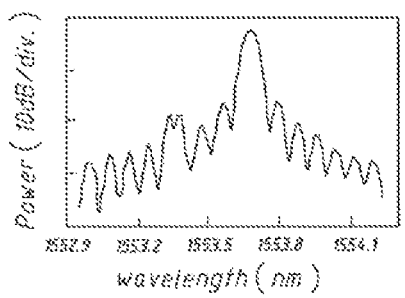
FIG. 6 is a spectrum diagram schematically showing the second optical signal carrying a second upstream signal in Amplitude Shift Keying (ASK) format according to an embodiment of the present invention.
Figure 7:
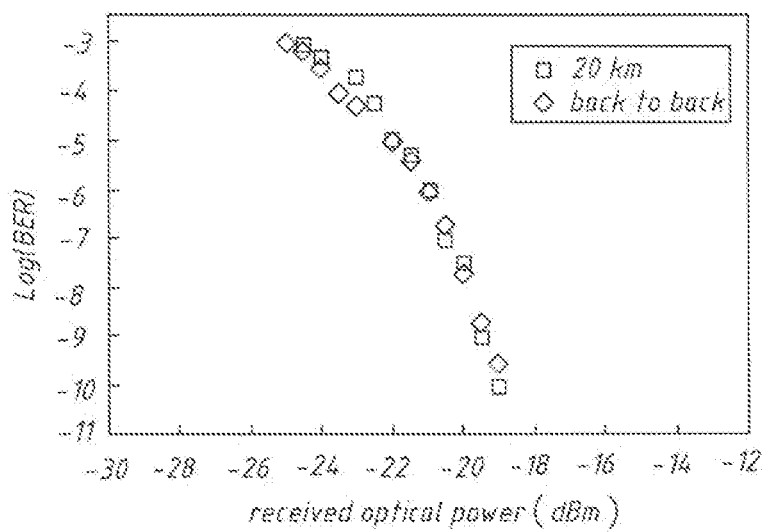
FIG. 7 is a diagram showing BER curves of the second downstream signal after transmitting over 0 km and 20 km according to an embodiment of the present invention.
Figure 8:
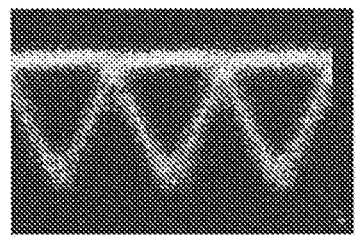
FIG. 8 is an eye diagram showing the second downstream signal after transmitting over 0 km according to an embodiment of the present invention.
Figure 9:
FIG. 9 is an eye diagram showing the second downstream signal after transmitting over 20 km according to an embodiment of the present invention.
Figure 10:
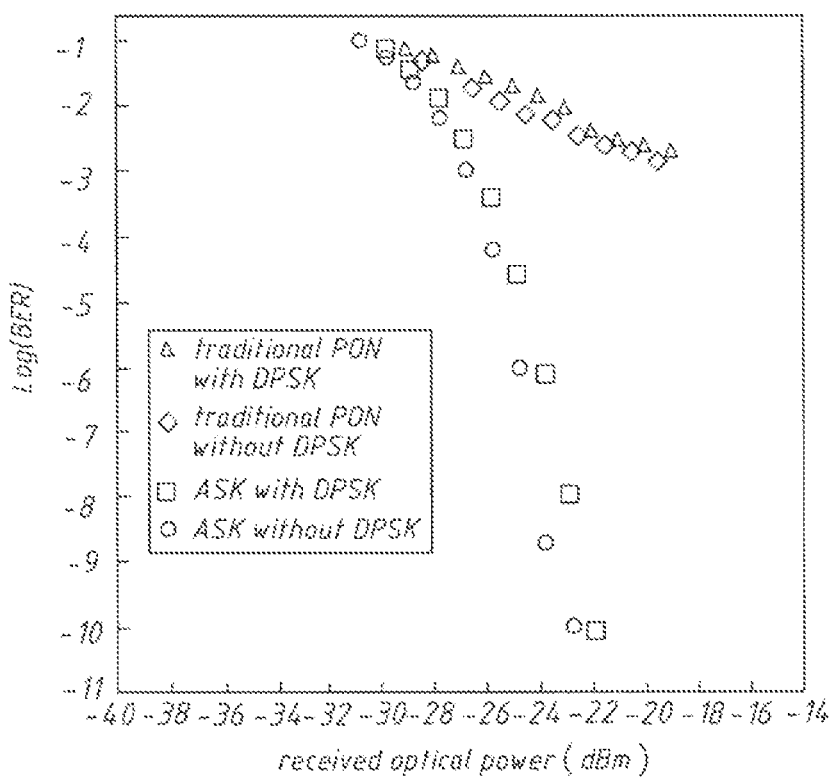
FIG. 10 is a diagram showing bit error rate (BER) curves of the upstream signals of the present invention and the traditional technology with and without Differential Phase Shift Keying (DPSK)

Refer to FIG. 1. The present invention designs an experimental architecture. The first optical generator 28 is exemplified by the DFB laser. As shown in FIG. 4 and FIG. 5, the second optical signal has a wavelength of 1553 nm and an average power of 5 dBm, and carries the second downstream signal of 10 Gb/s. A transmission distance between the WDM-OLT 14 and the WDM-ONU 18 is about 20 km. An Erbium-Doped Fiber Amplifier (EDFA) 54 amplifies the second optical signal carrying the second downstream signal, and then transmits into an optical fiber. The first filter 20 is a square filter whose band between stop band and pass band has a slope of 150 dB/nm. Besides, the first RF signal has a frequency of 10 GHz and carries the second upstream signal of 2.5 Gb/s. The second optical signal carrying the second upstream signal in the ASK format is shown in FIG. 6.

Refer to FIG. 1 and FIGS. 7-9. A diamond data denotes that the WDM-OLT 14 is connected with the WDM-ONU 18 in back-to-back way. From the figures, the second downstream signal of the present invention has a bit-error-rate (BER) of less than $10^{-9}$. The invested triangularity of the eye diagrams is due to the square filter. The performance of the second downstream signal after transmitting over 0 km and 20 km is almost equal.

Refer to FIGS. 10-14. FIGS. 11-14 respectively correspond to a triangular data, a diamond data, a square data, and a circle data of FIG. 9, and the triangular data and diamond data do not adopt ASK modulation. From the figures, it is known that Rayleigh scattering causes great damages to the performance of signal without separating the frequencies of an upstream signal and a downstream signal. The upstream signal does not have a BER of less than $10^{-3}$. In addition, transmitting a downstream in DPSK format slightly affects the performance of an upstream signal. If the upstream signals want to have the same BER, the received optical power is enlarged by less than 1 dBm.

In conclusion, the present invention can integrate the TDM-PON and the WDM-PON with the lowest cost and enhance the performance of the upstream signal.

The embodiments described above are only to exemplify the present invention but not to limit the scope of the present invention. Therefore, any equivalent modification or variation according to the shapes, structures, characteristics and spirit of the present invention is to be also included within the scope of the present invention.

What is claimed is:

1. An integrated passive optical network (PON) system comprising:
   an optical distribution network (ODN);
   a time-division multiplexing (TDM)-optical line terminal (OLT) connected with said ODN, generating a first optical signal carrying a first downstream signal, and transmitting said first optical signal to said ODN;
   a wavelength-division multiplexing (WDM)-optical line terminal (OLT) connected with said ODN, generating a second optical signal carrying a second downstream signal, and transmitting said second optical signal to said ODN, and wavelengths of said second optical signal and said first optical signal are different;
   a plurality of time-division multiplexing (TDM)-optical network units (ONUs) connected with said ODN to receive said first optical signal and said second optical signal, respectively retrieving said first downstream signal, and said TDM-ONUs generate a plurality of third optical signals each carrying a first upstream signal according to said first downstream signal for different duration and transmits said third optical signals to said TDM-OLT and said WDM-OLT through said ODN, and then said TDM-OLT retrieves said first upstream signals from said third optical signals; and
   at least one wavelength-division multiplexing (WDM)-optical network unit (ONU) comprising a first filter, connected with said ODN to receive said first optical signal and said second optical signal, and said WDM-ONU uses a first RF signal to carry a second upstream signal, and said WDM-ONU uses said first filter to retrieve said second downstream signal, and said WDM-ONU modulates said second optical signal to carry said second upstream signal in Amplitude Shift Keying (ASK) format, and frequency of said second upstream signal in said ASK format is equal to frequency of said first RF signal plus frequency of said second optical signal, and said WDM-ONU transmits them to said WDM-OLT and said TDM-OLT through said ODN, and said WDM-OLT retrieves said second upstream signal from said second optical signal.

2. The integrated passive optical network system according to claim 1, wherein said ODN further comprises:
   a first splitter connected with said TDM-OLT and said WDM-OLT to receive said first optical signal and said second optical signal and sending them out; and
   a second splitter connected with said first splitter, said TDM-ONUs, and said WDM-ONU to receive said first optical signal and said second optical signal and transmitting them to said TDM-ONUs and said WDM-ONU.

3. The integrated passive optical network system according to claim 1, wherein said WDM-OLT further comprises a second filter, and said WDM-OLT uses said second filter to retrieve said second upstream signal from said second optical signal.

4. The integrated passive optical network system according to claim 3, wherein said WDM-OLT further comprises:
   a first optical signal generator generating said second optical signal;
   a phase modulator (PM) connected with said first optical signal generator, receiving said second optical signal and said second downstream signal, modulating said second optical signal to carry said second downstream signal in Differential Phase Shift Keying (DPSK) format, and sending out said second optical signal;
   a circulator connected with said second filter, said PM, and said ODN to receive said second optical signal, and transmitting it to said ODN, or said circulator receives said second and third optical signals from said ODN and transmits them to said second filter, and then said second filter filters out said second optical signal; and
   a receiving terminal connected with said second filter to receive said second upstream signal.

5. The integrated passive optical network system according to claim 4, wherein said first optical signal generator is a distributed feedback (DFB) laser.

6. The integrated passive optical network system according to claim 3, wherein said WDM-ONU further comprises:
   a third filter;
   a coupler connected with said first filter, said third filter, and said ODN to receive said first and second optical signals, and transmitting them to said first filter and said third filter, and then said first filter filters out said second optical signal and said third filter filters out said second optical signal;
   a receiving terminal connected with said first filter to receive said second downstream signal;
   a mixer receiving said second upstream signal and said first radio frequency (RF) signal and using said first RF signal to carry said second upstream signal;
   a phase shifter connected with said mixer to receive said first RF signal, shifting phase of said first RF signal to form a second radio frequency (RF) signal carrying said second upstream signal, and sending out said first RF signal and said second RF signal; and
   a dual-parallel Mach-Zehnder modulator (DP-MZM) connected with said phase shifter, said coupler, and said third filter to receive said first RF signal, said second RF signal, and said second optical signal, biased to modulate said second optical signal to carry said second upstream signal in said ASK format, and said DP-MZM transmits said second optical signal carrying said second upstream signal in said ASK format to said ODN through said coupler.

7. The integrated passive optical network system according to claim 6, wherein said DP-MZM has an upper arm, a lower arm, and an output arm, and said upper and lower arms are connected with said phase shifter to respectively receive said first and second RF signals, and said output arm is connected with said coupler and sends out said second optical signal, and said upper and lower arms are biased to Vit, and said output arm is biased to $V\pi/2$.

8. The integrated passive optical network system according to claim 6, wherein phase of said first RF signal and said second RF signal is different by 90 degrees.

9. The integrated passive optical network system according to claim 3, wherein said WDM-ONU further comprises:
   a coupler connected with said ODN through said first filter and directly connected with said ODN, and said first filter receives said first and second optical signals and then filters out said second optical signal and transmits said second optical signal to said coupler;
   a receiving terminal connected with said coupler to receive said second downstream signal;
   a mixer receiving said second upstream signal and said first radio frequency (RF) signal and using said first RF signal to carry said second upstream signal;
   a phase shifter connected with said mixer to receive said first RF signal, shifting phase of said first RF signal to form a second radio frequency (RF) signal carrying said second upstream signal, and sending out said first RF signal and said second RF signal; and
   a dual-parallel Mach-Zehnder modulator (DP-MZM) connected with said phase shifter and said coupler to receive said first RF signal, said second RF signal, and said second optical signal, biased to modulate said second optical signal to carry said second upstream signal in said ASK, and said DP-MZM transmits said second optical signal carrying said second upstream signal in said ASK format to said ODN through said coupler.

10. The integrated passive optical network system according to claim 9, wherein said DP-MZM has an upper arm, a lower arm, and an output arm, and said upper and lower arms are connected with said phase shifter to respectively receive said first and second RF signals, and said output arm is connected with said coupler and sends out said second optical signal, and said upper and lower arms are biased to Vit, and said output arm is biased to $V\pi/2$.

11. An integrated passive optical network (PON) system comprising:
   an optical distribution network (ODN);
   a time-division multiplexing (TDM)-optical line terminal (OLT) connected with said ODN, generating a first optical signal carrying a first downstream signal, and transmitting said first optical signal to said ODN;
   a wavelength-division multiplexing (WDM)-optical line terminal (OLT) connected with said ODN, generating a second optical signal carrying a second downstream signal, and transmitting said second optical signal to said ODN, and wavelengths of said second optical signal and said first optical signal are different;
   a plurality of time-division multiplexing (TDM)-optical network units (ONUs) connected with said ODN to receive said first optical signal and said second optical signal, respectively retrieving said first downstream signal, and said TDM-ONUs generate a plurality of third optical signals each carrying a first upstream signal according to said first downstream signal for different duration and transmits said third optical signals to said TDM-OLT and said WDM-OLT through said ODN, and then said TDM-OLT retrieves said first upstream signals from said third optical signals; and
   at least one wavelength-division multiplexing (WDM)-optical network unit (ONU) comprising a first filter, connected with said ODN to receive said first optical signal and said second optical signal, and said WDM-ONU uses said first filter to retrieve said second downstream signal,
   wherein said WDM-OLT further comprises a second filter and generates a fourth optical signal whose wavelength is different from said wavelengths of said first and second optical signals, and wherein said WDM-ONU modulates said fourth optical signal to carry a second upstream signal and transmits them to said WDM-OLT and said TDM-OLT through said ODN, and then said WDM-OLT uses said second filter to retrieve said second upstream signal from said fourth optical signal,
   wherein said WDM-ONU further comprises:
   a third filter;
   a coupler connected with said first filter, said third filter, and said ODN to receive said first and second optical signals and said fourth optical signal, and transmitting them to said first filter and said third filter, and then said first filter filters out said second optical signal and said third filter filters out said fourth optical signal;
   a receiving terminal connected with said first filter to receive said second downstream signal;
   a mixer receiving said second upstream signal and a first radio frequency (RF) signal and using said first RF signal to carry said second upstream signal;
      a phase shifter connected with said mixer to receive said first RF signal, shifting phase of said first RF signal to form a second radio frequency (RF) signal carrying said second upstream signal, and sending out said first RF signal and said second RF signal; and
   a dual-parallel Mach-Zehnder modulator (DP-MZM) connected with said phase shifter, said coupler, and said third filter to receive said first RF signal, said second RF signal, and said fourth optical signal, biased to modulate said fourth optical signal to carry said second upstream signal in Amplitude Shift Keying (ASK) format, and frequency of said second upstream signal in said ASK format is equal to frequency of said first RF signal plus frequency of said fourth optical signal, and said DP-MZM transmits said fourth optical signal carrying said second upstream signal in said ASK format to said ODN through said coupler.

12. The integrated passive optical network system according to claim 11, wherein said WDM-OLT further comprises:
   a first optical signal generator generating said second optical signal;
   a second optical signal generator generating said fourth optical signal;
   a phase modulator (PM) connected with said first optical signal generator, receiving said second optical signal and said second downstream signal, modulating said second optical signal to carry said second downstream signal in Differential Phase Shift Keying (DPSK) format, and sending out said second optical signal;
   a coupler connected with said PM and said second optical signal generator to receive said second optical signal and said fourth optical signal, and sending them out;

a circulator connected with said second filter, said coupler, and said ODN to receive said second optical signal and said fourth optical signal, and transmitting them to said ODN, or said circulator receives said third and fourth optical signals from said ODN and transmits them to said second filter, and then said second filter filters out said fourth optical signal; and a receiving terminal connected with said second filter to receive said second upstream signal.

13. The integrated passive optical network system according to claim 12, wherein said first and second optical signal generators are DFB lasers.

14. The integrated passive optical network system according to claim 11, wherein said DP-MZM has an upper arm, a lower arm, and an output arm, and said upper and lower arms are connected with said phase shifter to respectively receive said first and second RF signals, and said output arm is connected with said coupler and sends out said fourth optical signal, and said upper and lower arms are biased to $V\pi$, and said output arm is biased to $V\pi/2$.

15. The integrated passive optical network system according to claim 14, wherein phase of said first RF signal and said second RF signal is different by 90 degrees.

* * * * *